UNITED STATES PATENT OFFICE.

EUGEN SCHAAL, OF STUTTGART, WÜRTEMBERG, GERMANY.

PROCESS OF MAKING ETHERS FROM PETROLEUM.

SPECIFICATION forming part of Letters Patent No. 366,885, dated July 19, 1887.

Application filed March 27, 1885. Serial No. 160,278. (Specimens.)

*To all whom it may concern:*

Be it known that I, EUGEN SCHAAL, a subject of the King of Würtemberg, residing at Stuttgart, in the Kingdom of Würtemberg and German Empire, have invented new and useful Improvements in the Manufacture of Petrol-Acid Ethers, of which the following is a specification.

This invention relates to the manufacture of petrol-acid ethers from liquid petrol acid.

The liquid petrol acid is obtained as follows: I take, say, five hundred pounds of petroleum composed of hydrocarbons, the boiling-point of which varies between 150° centigrade to 400° centigrade, and bring the same into a metallic retort provided with a suitable agitator and with a cooling-tube which is upwardly inclined or otherwise arranged, so that the liquid which results from the condensation of the vapors runs back into the retort. To the petroleum I add from twenty to thirty pounds of an alkaline substance—such, for instance, as oxide of calcium or caustic soda, or a mixture prepared of equal parts of oxide of calcium, caustic soda, and carbonate of soda—and then the retort is heated, so as to cause the mass to boil violently under constant stirring, while at the same time a current of atmospheric air or oxygen is passed through the mixture by means of an air-pump or otherwise. After the boiling has continued for about half an hour (more or less) an additional quantity of alkali is introduced, which may be effected through the cooling-tube, in a manner well known to chemists. The whole quantity of alkali employed may be as much as one hundred and twenty-five pounds, or twenty-five per cent. of the petroleum used. The supply of the alkali must be regulated so as to have some free alkali present during the entire process of conversion. By the action of the oxygen the petroleum is converted into acids, which combine with the alkali, forming soaps, which being mostly insoluble in the remaining liquor are precipitated to the bottom of the retort. The process of converting petroleum into soaps may, however, be changed; and I do not wish to confine myself to the precise means above described. The oxidation may, for instance, be effected by the action of materials which give up oxygen—such, for example, as a mixture of chlorates, nitrates, and permanganates with acid sulphates. Different kinds of petroleum, earth-oils, and brown coal-oils, or similar hydrocarbons, may be converted into soaps in the manner above described.

The soaps obtained as above stated can be separated, if a surplus of petroleum is present, partly by mechanical means. The soaps themselves are mixtures of a series of alkaline salts, from which by fractional precipitation the acids can be separated. Insoluble metal soaps are decomposed and the organic petrol acids are separated by means of benzine, ether, caustic or carbonate of soda, and similar means. The acid mixture obtained by either of the above means consists of solid and fluid petrol acid. The liquid petrol acid is separated from the solid petrol acid by extraction or benzine. The solid petrol acid remains, and the liquid petrol acid, which dissolves in the petroleum or benzine, is separated therefrom by any suitable means. The separation of the liquid from the solid petrol acid can also be effected by distillation *in vacuo*, in which case the solid petrol acid remains and the liquid petrol acid goes over. Fractional precipitation may also be employed.

The liquid petrol acid can be combined with alcohols, phenols, and carbohydrates, so as to form petrol-acid ethers. In order to effect this combination I proceed as follows: I mix the petrol acid and the alcohol, phenol, or carbohydrate according to their atomic weights, and by heating this mixture to a high temperature the combination is effected. In some cases it is desirable to add to the mixture hygroscopic substances which favor the reaction, and sometimes indifferent gases—such as carbonic-acid gas—may be introduced for the purpose of removing the water. The combination of the liquid petrol acid with the alcohols, phenols, or carbohydrates may also be effected by dissolving the liquid petrol acid in ethyl alcohol and introducing into this solution dry hydrochloric acid, or, instead of this, the solution may be boiled with sulphuric acid or with acid or water absorbing salts.

The petrol-acid ethers obtained by either of the above methods are separated by distillation from the surplus of alcohol, and they are freed from other substances by washing with water and soda, and they are finally purified by distillation *in vacuo*, as far as the same can be distilled without decomposition.

The properties of the petrol-acid ethers differ somewhat, according to the properties of the alcohol employed. The first fractions of the methyl, butyl, or ethyl ethers have an agreeable odor, and can be used for perfumery purposes. The fractions having a higher boiling-point, and also the phenol ethers, are oily substances. The glycerine and sugar ethers are very similar to natural oils and fats, and cannot be distilled without decompositions. All these ethers have the common property that they are insoluble in water, soluble in ether, benzine, chloroform, and generally, also, in alcohol. They have a more or less oily or fatty appearance, are not decomposed by soda, and form soaps with caustic alkalies. An analysis of an ethyl ether gives $$C = 72, 14$$
$$H = 10, 85$$
$$O = 17, 1,$$

which points to the formula $C_{10}H_{17}O_2(C_2H_5)$.

What I claim as new, and desire to secure by Letters Patent, is—

The process set forth, consisting in distilling petroleum while under agitation and in the presence of a free alkali, passing a current of atmospheric air or oxygen through the same in the retort, mingling the liquid petrol acid with an alcohol, heating the mixture, and finally separating, washing, and purifying the petrol-acid ethers hereby produced, substantially as described.

In testimony whereof I have hereunto set my hand and seal in the presence of two subscribing witnesses.

EUGEN SCHAAL. [L. S.]

Witnesses:
 FRIEDRICH OEHM,
 T. H. ABENHEIM.